(12) United States Patent
Boltz et al.

(10) Patent No.: US 10,630,159 B2
(45) Date of Patent: Apr. 21, 2020

(54) MAGNETIC COUPLING ROTOR

(71) Applicant: Spheros GmbH, Gilching (DE)

(72) Inventors: Norbert Boltz, Haar (DE); Alfred Landmann, Maisach (DE); Felix Muller-Spanka, Furstenfeldbruck (DE)

(73) Assignee: VALEO THERMAL COMMERICAL VEHICLES GERMANY GMBH, Gilching (DE)

( * ) Notice: Subject to any disclaimer, the term of this patent is extended or adjusted under 35 U.S.C. 154(b) by 497 days.

(21) Appl. No.: 15/401,317

(22) Filed: Jan. 9, 2017

(65) Prior Publication Data

US 2017/0201168 A1     Jul. 13, 2017

(30) Foreign Application Priority Data

Jan. 11, 2016 (DE) .................. 10 2016 100 375

(51) Int. Cl.
*H02K 49/10* (2006.01)
*H02K 7/11* (2006.01)
*H02K 7/00* (2006.01)

(52) U.S. Cl.
CPC .......... *H02K 49/104* (2013.01); *H02K 7/003* (2013.01); *H02K 7/11* (2013.01); *H02K 49/106* (2013.01)

(58) Field of Classification Search
CPC ....... H02K 49/104; H02K 49/106; H02K 7/11
See application file for complete search history.

(56) References Cited

U.S. PATENT DOCUMENTS

| 2,464,017 | A | * | 3/1949 | Berghorn ............... H02K 5/15 |
| | | | | 220/691 |
| 6,075,301 | A | | 6/2000 | Shinoda |
| 6,911,756 | B1 | | 6/2005 | Chang |
| 7,898,136 | B2 | | 3/2011 | Poulin et al. |

(Continued)

FOREIGN PATENT DOCUMENTS

| DE | 10 2010 041 585 A1 | 3/2012 |
| EP | 1 346 458 B1 | 11/2008 |
| JP | 3-285546 A | 12/1991 |

OTHER PUBLICATIONS

Office Action for application No. DE 10 2016 100 375.1 dated Nov. 4, 2016.

*Primary Examiner* — Jue Zhang
*Assistant Examiner* — Bart Iliya
(74) *Attorney, Agent, or Firm* — Sughrue Mion, PLLC

(57) ABSTRACT

A magnetic coupling rotor includes permanent magnets arranged at equal angular spacings about its axis of rotation, wherein they respectively face radially inwardly and radially outwardly with their pole faces, of which a respective one bears against a backiron body of ferromagnetic material. The backiron body is a cylindrical ring with smooth peripheral surfaces. Provided for the permanent magnets is a holding device comprising a not or only weakly magnetizable injection-moldable material in the form of a rotary-symmetrical body having recesses for receiving the permanent magnets. The diameters of the holding means and the backiron body are such that they can be fitted together coaxially such that the backiron body at least partially covers the recesses in a radial direction. Thus, formed between it and the holding means is an even number of insertion compartments into which permanent magnets may be inserted.

10 Claims, 4 Drawing Sheets

(56) References Cited

U.S. PATENT DOCUMENTS

| | | | | |
|---|---|---|---|---|
| 9,467,012 B2* | 10/2016 | Lam | .................. | H02K 1/17 |
| 2004/0084978 A1* | 5/2004 | Uemura | ............... | H02K 1/2786 |
| | | | | 310/74 |
| 2008/0088195 A1* | 4/2008 | Dooley | ................ | H02K 1/2786 |
| | | | | 310/156.26 |
| 2010/0237732 A1* | 9/2010 | Grann | ................. | H02K 49/106 |
| | | | | 310/103 |
| 2016/0190881 A1* | 6/2016 | Kanatani | ............. | H02K 1/2786 |
| | | | | 310/156.01 |

* cited by examiner

MAGNETIC COUPLING ROTOR

BACKGROUND OF THE INVENTION

Field of the Invention

The invention concerns a magnetic coupling rotor and a magnetic coupling constructed with at least one such rotor.

Background

In many situations in which a body which is disposed in a casing that is to be sealed off is to be driven to perform a rotary movement it is disadvantageous for that body to be connected directly to the shaft of the driving motor because in that case the opening in the casing, required for the shaft to pass therethrough, has to be sealed off by a so-called dynamic seal which cannot guarantee absolute sealing integrity and which is subject to a high degree of wear.

To avoid that problem it is known to use a magnetic coupling which includes two rotors of which one coaxially surrounds the other and of which both are fitted with an even number of permanent magnets which serve for torque transmission. One of the two rotors which forms the drive side of the coupling is connected to the shaft of a motor while the other rotor forming the driven side of the coupling is connected by means of a shaft to the body to be driven in rotation. Here too admittedly the casing which is to be sealed off must have a through opening for last-mentioned shaft, but no sealing means is required for same because it is possible to arrange between the two rotors a so-called coupling enclosure or can which is in the form of a hollow-cylindrical body which concentrically surrounds the rotor connected to the body to be driven. At one of its axial ends the coupling enclosure is sealingly closed by a bottom while at its other axial end it is connected to the housing for example by a screw means with an interposed wear-free static seal or by an absolutely sealed welded seal, or is formed in one piece with the casing.

The situations of use just referred to above include fluid pumps, in the casing of which is arranged an impeller driven by a motor, in particular an electric motor, by means of an magnetic coupling arrangement. The fluid which flows through the pump casing can readily pass through the through opening of the impeller/rotor shaft into the coupling enclosure because the latter is sealingly connected to the pump casing so that complete encapsulation of the medium to be conveyed by the pump in relation to the environment is achieved, without a dynamic seal being required for that purpose.

It is known from the state of the art for the permanent magnets required for a magnetic coupling rotor to be mounted directly to a backiron body (yoke body or magnet field return body) of ferromagnetic material. For that purpose depressions are produced therein for example by cutting machining, with the permanent magnets being glued into the depressions in order to fix them both in the axial and also in the peripheral direction. As an alternative thereto the backiron body can be sintered in a suitable configuration. Those production methods are very complicated and laborious and lead to high production costs. In addition the permanent magnets are unprotected in the backiron body and problems can arise with the long-term strength of the adhesive. Simply holding the permanent magnets to the backiron body solely by virtue of mutual magnetic attraction is not adequate because the forces required for torque transmission cannot be carried thereby to an adequate degree.

Instead of gluing the permanent magnets in place or in addition thereto it is also possible for them to have plastic material injection molded around them. That admittedly leads to better protection for the permanent magnets but in that case they are exposed to the high plastic processing temperature whereby there is a risk of demagnetization.

An alternative to that is for the permanent magnets to be fixed to the backiron body with plastic cages, wherein the definitive form of the rotor inclusive of the hub required for mounting it is produced in an injection molding operation. Here too there is the problem of a high temperature loading on the permanent magnets in production. In addition unnecessarily large wall thicknesses are produced so that a correspondingly wide gap is required between the two rotors of the magnetic coupling whereby the magnetic force required for torque transmission is reduced.

In comparison therewith the object of the invention is to provide a fundamental structure for a magnetic coupling rotor, which makes it possible for it to be provided both as the driving rotor and also as the driven rotor and which in both cases allows simple and inexpensive assembly of the entire arrangement, in particular without a temperature loading on the permanent magnets.

To attain that object the invention provides the features claimed herein.

SUMMARY OF THE INVENTION

By virtue of the fact that, as a departure from the above-mentioned state of the art, the backiron body is in the form of a cylindrical ring with smooth peripheral or circumferential surfaces, the permanent magnets can no longer be fixedly mounted thereto. As that however is absolutely required for torque transmission, the invention provides a holding means comprising an injection-moldable material which is not or only slightly magnetizable and which is of a rotary-symmetrical configuration with respect to the axis of rotation and which has recesses which fix the permanent magnets in the peripheral direction in the assembled condition. The recesses can have open sides in the radial direction, of which one side, when the holding means is fitted together by a simple translatory movement in the axial direction with the annular backiron member, is at least partially covered by same. In that way insertion compartments are formed, which are open in the axial direction and into which the permanent magnets can be simply pushed in the axial direction. The dimensions of the insertion compartments are somewhat larger than those of the permanent magnets so that they can be easily pushed into same, but at least in the peripheral direction there is only a minimal play; that is characterised in the present context by the expression "precise fit".

The term "rotary-symmetrical" used for the holding means, in contrast to the term "rotationally symmetrical", is intended to express the point that the geometry of the holding means can be mapped onto itself only by rotations through given angles but not through just any desired angles.

A particular advantage of the arrangement according to the invention is that the backiron body is in the form of a smooth ring and does not have any structures for fixing the permanent magnets in the peripheral direction, whereby its manufacturing costs are considerably reduced.

Fixing of the permanent magnets in the peripheral direction, that is required for torque transmission, is effected exclusively by the holding means which comprises an injection-moldable material, for example plastic, or a metal which is not ferromagnetic or only slightly ferromagnetic.

By virtue of the fact that the holding means if produced using injection molding technology its production costs are independent of the number Y of the recesses provided. Thus there is no problem in using one and the same holding means for magnetic coupling rotors which are to be equipped with a differing number of permanent magnet pairs for different torque demands.

Apart from the fact that Y must be an even number the value of said parameter is defined only by the dimension of the permanent magnets used in the peripheral direction and the periphery of the holding means. Advantageously the recesses are arranged distributed at equal angular spacings around the periphery of the holding means. It is particularly advantageous if Y is equal to $2^n$ with n>1 (4, 8, 16 and so forth) because then the number of options involved in equipping the insertion compartments formed from the recesses with differing numbers of permanent magnets according to requirements is at a maximum. It is however also possible to use for example 12 recesses or insertion compartments, into which 2, 4, 6 or 12 permanent magnets can then be inserted at equal angular spacings depending on the respective torque demand.

By virtue of the possibility of varying the number of permanent magnets fitted in the insertion compartments without increased costs it is possible with one and the same holding means to construct magnetic coupling rotors for different magnetic couplings which differ in respect of the torque to be transmitted. When providing a magnetic coupling series covering different torque demands that leads to a considerably reduced number of components and thus results in lower manufacturing costs.

Advantageously the holding means is provided with an annular flange against which the backiron body comes to bear in the assembled condition. In that way the insertion compartments formed between the holding means and the backiron body can be closed on one of their two axial sides while the opposite side is initially open to permit the permanent magnets to be inserted.

Preferably there is provided a device which, after assembly of holding means, backiron body and permanent magnets has been effected, serves to also close the insertion compartments on the side opposite to the annular flange in the axial direction. At the same time that device can serve to secure the backiron body against axial displacement with respect to the holding means.

It is essential that a magnetic coupling rotor according to the invention can be fitted together from its components by simple mechanical assembly procedures without adhesives being used or without any components having plastic material injection molded around them. Thus the permanent magnets are not exposed to any temperature stress and impairment of the magnetic properties is prevented. It is also possible to achieve thin-wall structures which permit optimum force transmission in respect of the permanent magnets.

The features of the invention can be used both in an external rotor and also an internal rotor of a magnetic coupling.

A magnetic coupling according to the invention preferably includes an external rotor according to the invention and an internal rotor according also according to the invention. There are however conceivable situations in which only one of the two rotors is of a structure in accordance with the invention while the other rotor is of a structure differing therefrom.

A particularly preferred situation of use of a magnetic coupling according to the invention is a fluid pump in which the impeller of the pump is connected to the driven magnetic coupling rotor and same is disposed in a covering enclosure.

BRIEF DESCRIPTION OF THE DRAWINGS

The invention is described hereinafter by means of embodiments by way of example with reference to the drawing in which.

All components and units reproduced in the Figures are reproduced in greatly simplified form for the sake of enhanced clarity. When terms like "up" and "down" are used in following specific description that relates exclusively to the respective Figure and does not restrict the spatial position of the corresponding parts of the arrangement either in regard to assembly or in operation.

DETAILED DESCRIPTION OF THE PREFERRED EMBODIMENTS

Figure 1:
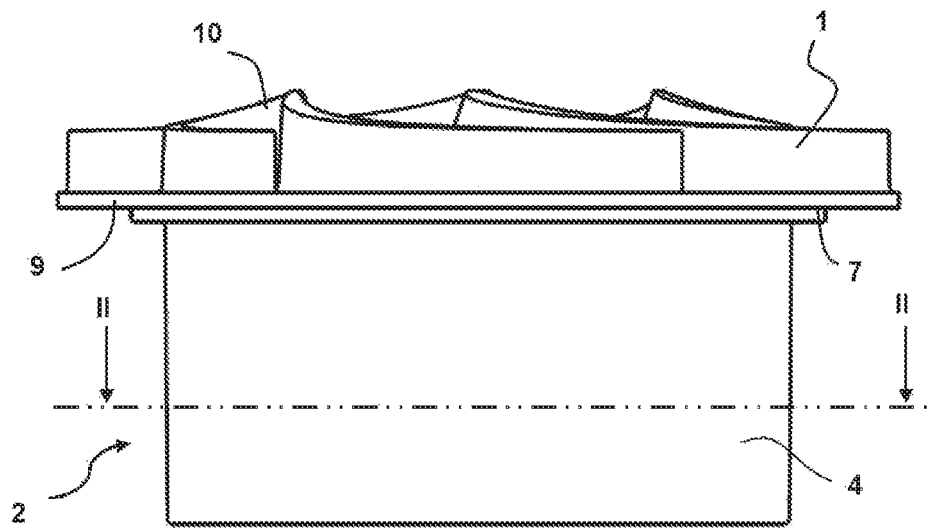
FIG. 1 shows a side view of a magnetic coupling rotor according to the invention which is in the form of the driven rotor of a magnetic coupling for a fluid pump whose impeller it drives.
Figure 3:
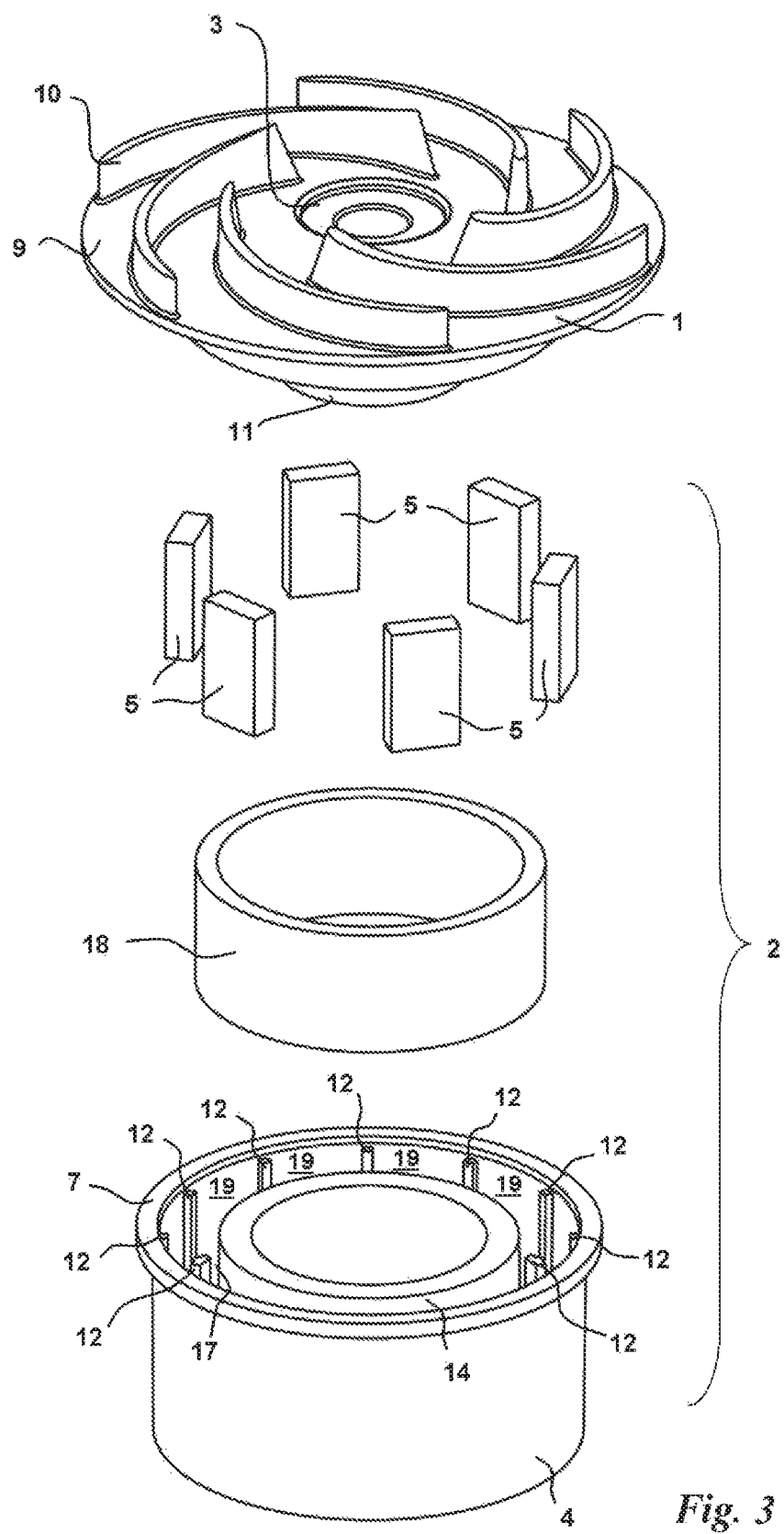
FIG. 3 shows a perspective exploded view of the arrangement of FIG. 1.

FIGS. 1 and 3 show the impeller 1 of a fluid pump which is rotationally fixedly connected to a magnetic coupling rotor 2 in the form of a drivable internal rotor.

The magnetic coupling rotor 2 includes a circular-cylindrical holding means 4 comprising a material which is not ferromagnetic or which is only weakly ferromagnetic, for holding a group of permanent magnets 5 which are intended to transmit to the impeller 1 a torque which can be delivered by a driving magnetic coupling rotor 20 according to the invention which is described in greater detail hereinafter with reference to FIGS. 4 through 6.

At its initially open axial end towards the impeller 1 the circular-cylindrical holding means 4 of the magnetic coupling rotor 2 has a radially outwardly projecting circular annular flange 7 by means of which it can be concentrically fixed for example by adhesive, welding or screwing, to the one side of a circular disc 9 which forms a part of the impeller 1 and which on its opposite side carries the vanes 10 thereof, which in operation move the fluid to be conveyed forwardly. In the assembled condition the circular disc 9 closes the open end of the holding means 4. A concentric cylindrical collar 11 projects in the axial direction at the underside of the circular disc 9 and in the assembled condition engages from above into the internal space in the holding means 4.

Ribs 12 extending parallel to the axis of rotation are arranged at the cylindrical inside wall of the holding means 4 distributed around the periphery at equal angular spacings, extending substantially over the entire axial height of the holding means 4. Preferably the ribs 12 which form between them a respective recess 19 are in one piece with the holding means 4.

Thus recesses of equal size which serve to receive the permanent magnets 5 are formed between the ribs 12 at the inside wall of the holding means 4.

Because of the perspective view only nine of a total of twelve ribs 12 are to be seen in FIG. 3. The other three are concealed by the side, facing away from the viewer, of the front part of the cylindrical wall of the holding means 4.

In the illustrated embodiment the circular-cylindrical holding means 4 extends around a hollow cylinder 14 of circular cross-section, which is arranged coaxially with respect to the holding means 4 and which is of approximately the same axial height as the holding means 4 and which is open at its two axial ends. At its lower end the hollow cylinder 14 is integrally connected to the circular-cylindrical holding means 4 by a limb 16 which is in the shape of a circular ring (it is visible in the plan view in FIG. 2).

The limb 16 closes the circular-cylindrical hollow space 17 which is present between the holding means 4 and the hollow cylinder 14 and into which the ribs 12 project at its lower end.

In addition the magnetic coupling rotor 2 includes a backiron body 18 in the shape of a circular ring and which comprises a ferromagnetic material and which can be introduced in the axial direction from above into the circular-cylindrical hollow space 17 until it bears against the limb 16. Its inner and its outer peripheral surfaces are completely smooth in accordance with the invention. The outside diameter of the backiron body 18 is of such a size that, when it is introduced into the circular-cylindrical space 17, it bears with its inner peripheral surface in precisely fitting relationship against the cylindrical surface of the hollow cylinder 14, that is towards the hollow space 17, as can be seen in particular from FIG. 2.

In this condition the backiron body 18 covers over the previously open radial inward sides of the recesses 19 so that insertion compartments are formed between its outside wall and the inside wall of the holding means 4 and the ribs 12 (see in particular FIG. 2), wherein a respective permanent magnet 5 can be inserted into the insertion compartments in an axial direction from above in such a way that it bears in precisely fitting relationship with its radially inwardly and radially outwardly pole faces on the one hand against the backiron body 18 and on the other hand against the inside wall of the holding means 4 respectively, while its side edges are respectively held by two adjacent ribs 12 in the peripheral direction for the required torque transmission. In the present case there are twelve recesses 19 and thus also 12 insertion compartments so that the holding means 4 can receive at a maximum twelve permanent magnets 5.

Depending on the respective requirements, that is to say according to the magnitude of the torque to be transmitted however it is also possible to fit fewer permanent magnets 5, in the illustrated case for example only six or as an alternative thereto also four or two permanent magnets 5, in the insertion compartments of the holding means 4.

It is essential in that respect that the number of inserted permanent magnets 5 is an even number and that they are arranged distributed with alternate poles at equal angular spacings around the periphery of the holding means 4.

The concentric collar 11 at the underside of the circular disc 9 of the impeller 1 serves at the same time as a device for closing the insertion compartments at the upper axial end thereof, that is opposite to the limb 16.

In principle it is also possible to omit the hollow cylinder 14 and to close the holding means 4 at its axial end remote from the impeller 1 by a continuous bottom which then also takes over the above-discussed functions of the limb 16.

Assembly of the arrangement shown in FIG. 3 is implemented by firstly the backiron body 18 being introduced from above into the hollow space 17 in the form of a circular ring in the holding means 4 until it bears against the limb 16 or the bottom. The desired even number of permanent magnets 5 can then be inserted from above into the insertion compartments formed in that way, so that mutually adjacent permanent magnets 5 involve an opposite orientation of their poles.

The upwardly open holding means 4 is then closed by assembly to the impeller 1, in which case the downwardly projecting cylindrical collar 11 of the impeller 1 also serves to close the insertion compartments at their axially upward sides so that the inserted permanent magnets 5 are held fast both in the two peripheral directions and also in the two axial directions, in their precisely fitting insertion compartments. That permits on the one hand good torque transmission while on the other hand slipping in the axial direction is prevented.

The upper part of the impeller 1 includes a bearing bush which is injected in place and of which only the upper end face 3 is visible, serving at the same time as a thrust bearing. No bearing function is provided on the opposite side. The impeller 1 and the initially upwardly open holding means 4 are connected together by a suitable joining process, for example gluing, clipping or welding.

The unit formed in that way is mounted in a coupling enclosure or can (not shown) in which there is a suitable counterpart bearing in relation to the bore in the bearing bush. The coupling enclosure which is completed in that way and a pump cover (not shown) are connected together by suitable processes (gluing, welding). In principle it is also possible here to use processes like clipping or screwing, in which case then however an additional seal is required, which however involves a static seal which does not have the disadvantages of a dynamic seal, as are mentioned in the opening part of this specification.

Figure 4:
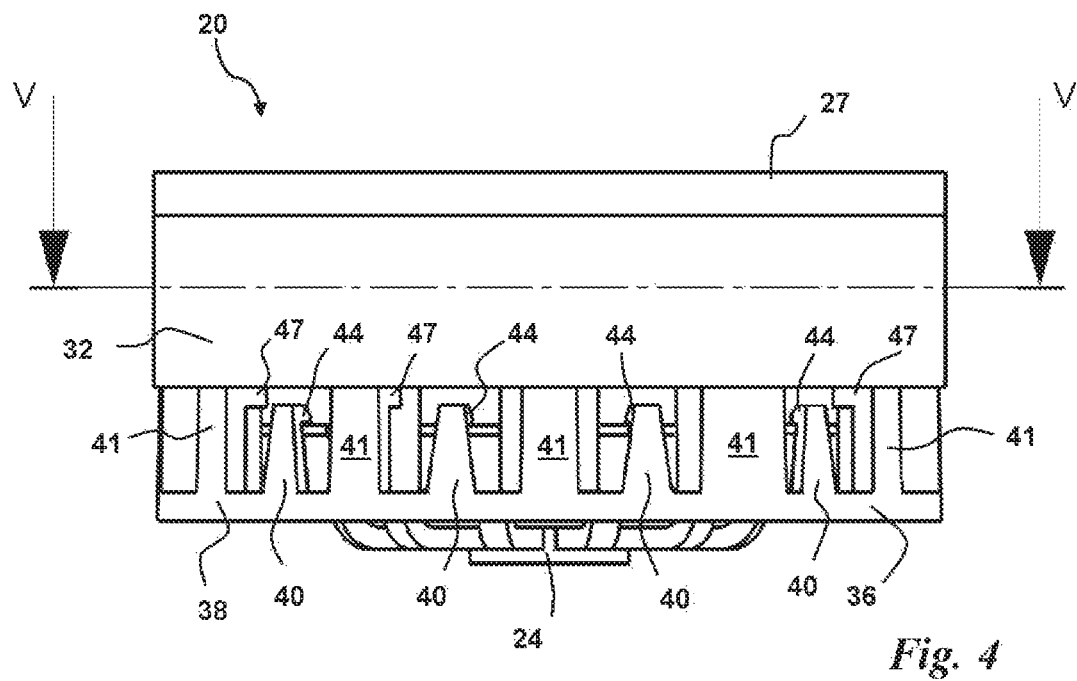
FIG. 4 shows a diagrammatic side view of a magnetic coupling rotor according to the invention which is provided as the drive rotor of a magnetic coupling according to the invention and which in turn can be driven by a motor (not shown)
Figure 5:
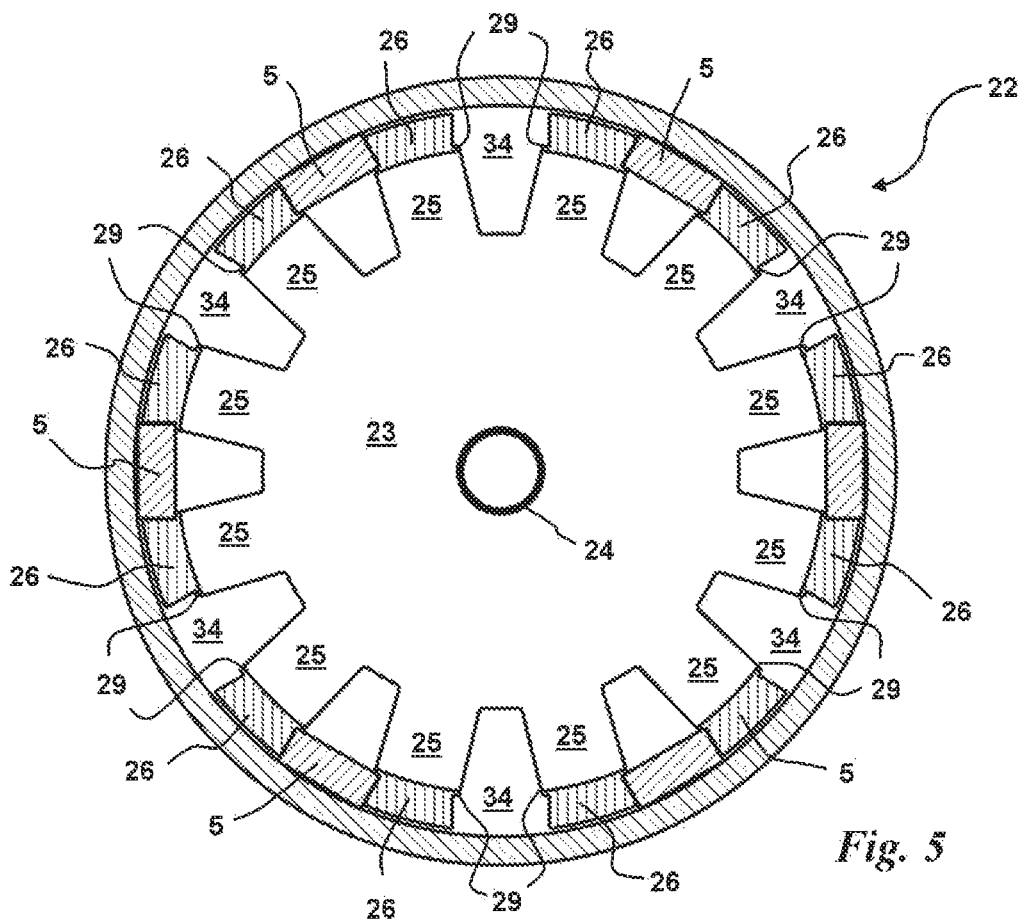
FIG. 5 shows a section through the magnetic coupling rotor of FIG. 4 along line V-V.
Figure 6:
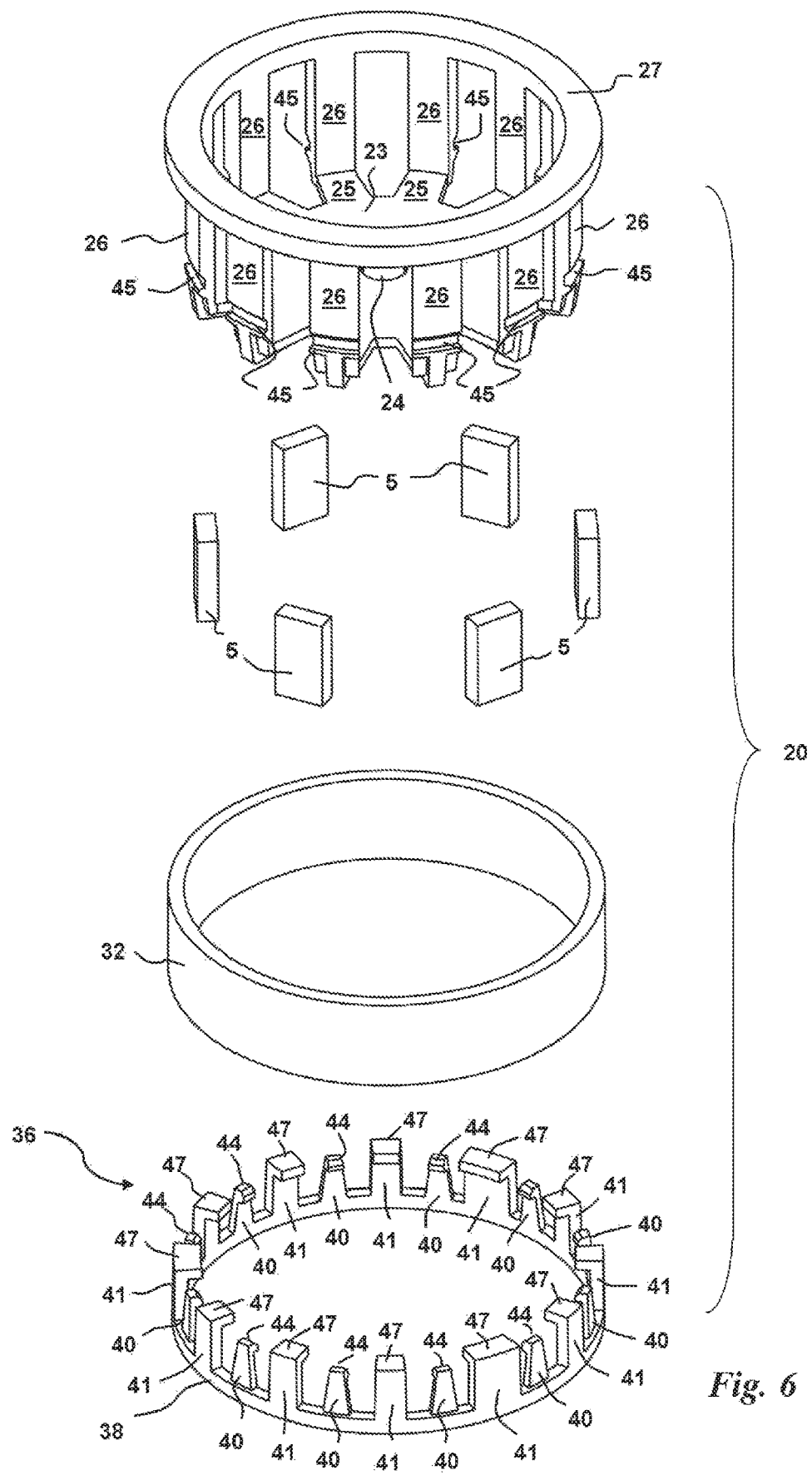
FIG. 6 shows a perspective exploded view of the magnetic coupling rotor of FIG. 4.

The magnetic coupling rotor 20 shown in FIGS. 4 through 6 is provided as a driving external rotor of a magnetic coupling according to the invention and includes as a holding means 22 for the permanent magnets 5, a cage structure comprising a material which is not ferromagnetic or only weakly ferromagnetic and which has a circular bottom 23, in the center of which there is a bearing bush 24 for connection to the shaft of an electric motor (not shown). From the bottom 23, symmetrically arranged arms 25 extend radially outwardly, which at their ends go into mutually parallel connecting ribs 26 which extend perpendicularly to the bottom 23 and which are of the same extent in the peripheral direction and which at their ends remote from the bottom 23 are connected to a circular annular flange 27 which extends over the entire periphery of the magnetic coupling rotor 20 and which projects radially outwardly.

The angular spacings of the connecting ribs 26 are so selected that a permanent magnet 5 can be positioned in precisely fitting relationship between two respective adjacent connecting ribs 26. At their two edges which are disposed radially inwardly and which extend parallel to the axis of rotation each of the connecting ribs 26 has projections 29 which, from the annular flange 27, extend in the direction of the bottom 23 and which are of a smaller thickness in the radial direction than the connecting ribs 26.

In that way, formed at the radial outward side of the holding means 22 formed by the cage structure are recesses 34 serving to receive permanent magnets 5. Those recesses 34 are delimited radially inwardly by the nose-like projections 29 and in an axial direction by the annular flange 27, being open in the opposite axial direction and radially outwardly.

This magnetic coupling rotor 20 also has a backiron body 32 which is in the form of a circular ring and which comprises a ferromagnetic material and which can be pushed in the axial direction from below on to the cage structure forming the holding means 23, to such an extent that it comes to bear against the annular flange 27. The outer and inner peripheral surfaces of this backiron body 32 are also completely smooth. Its inside diameter is of such a size that in the fitted condition it bears in precisely fitting relationship against the outsides of the connecting ribs 26.

In this position it closes the recesses 34 provided for receiving the permanent magnets 5, on the radial outward side thereof, so that insertion compartments are formed, which are only still open at their lower axial end. From that side, the permanent magnets 5 can be pushed in the axial direction into the insertion compartments until they butt against the annular flange 27. In FIG. 5, for the sake of clarity, only those recesses 34 forming insertion compartments, in which no permanent magnet 5 is inserted, are denoted by a reference.

In order to also close the insertion compartments at their axially downward open ends there is provided a closure device 36 comprising a material which is not ferromagnetic or which is only weakly ferromagnetic and which includes a circular ring 38 whose inside diameter is so adapted to the outside diameter of the cage structure forming the holding means 22, that it can be pushed on to same from below in the axial direction in order to enclose same in precisely fitting relationship.

At its axial top side the circular ring 38 has two groups of projections 40, 41 which are distributed over the periphery and which extend in the axial direction parallel to the axis of rotation and which are so arranged that each projection 40 of the one group is positioned between two projections 41 of the other group, and vice-versa. The projections 40 of the one group are each of the same extent in the peripheral direction and are at equal angular spacings. The same applies to the projections 41 of the other group which, by virtue of a distortion due to the perspective view adopted in FIG. 3, only apparently have different extents in the peripheral direction.

The projections 40 of the one group are of a somewhat shorter axial length than the projections 41 of the other group and are arranged distributed around the periphery of the circular ring 38 so that each of them can be positioned for pushing the circular rings 38 on to the holding means 22 at the outside of one of the connecting ribs 26. At their free ends the projections 40 have radially inwardly projecting latching noses 44 with which, when the circular ring 38 is pushed on to the holding means 22 in the axial direction, they firstly slide axially upwardly at the outside of a connecting rib 26, in which case they are elastically pressed slightly outwardly in the radial direction until then they latch into a groove 45 which extends at the outside of a respective connecting rib 26 in the peripheral direction, that is to say parallel to the annular flange 27, in order in that way to fix the closure device 36 to the holding means 22.

The projections 41 of the other group, which are somewhat longer in the axial direction, at their free ends have a small radially inwardly extending plate 47, the size of which is such that, when the circular ring 38 is pushed on to the holding means 22, they move upwardly between the connecting ribs 26 of the holding means 22, that is to say in the direction of the annular flange 27, and in the position in which the latching noses 44 of the other group of projections 40 latch into the grooves 45 of the connecting ribs 26, they close the hitherto open underside of the insertion compartments formed between the holding means 22 and the backiron body 32.

Assembly of the arrangement shown in FIG. 6 is effected by firstly the backiron body 32 being pushed from below on to the holding means 22 until it comes to bear against the underside of the annular flange 27. Then, an even number of permanent magnets 5 can be inserted from below into the insertion compartments which are formed thereby and which are still open at their lower axial ends, in which case mutually adjacent permanent magnets 5 are of opposite polarities.

By virtue of assembly with the closure device 36 the downwardly still open ends of the insertion compartments are then closed in such a way that each of the inserted permanent magnets 5 is held in precisely fitting relationship both in both peripheral directions and also in both axial directions in order to permit torque transmission and to prevent the permanent magnets 5 from slipping out of the insertion compartments.

The bearing bush 24 provided in the bottom 23 of the cage structure forming the holding means 22 comprises at any event metal so that the driving magnetic coupling rotor 20 can be fixed in a press fit on the output shaft of a drive motor (not shown). Additional processing of the shaft is not required and there is no adverse influence on the rotational truth of the magnetic coupling rotor 20.

This represents a considerable advantage over known arrangements in which the driving magnetic coupling rotor is clamped fast on a flat portion of the motor shaft for example with a grub screw which leads to an eccentric mass distribution and thus adversely affects rotational truth, this involving the additional working operations of cutting a thread and milling away the motor shaft.

Figure 2:
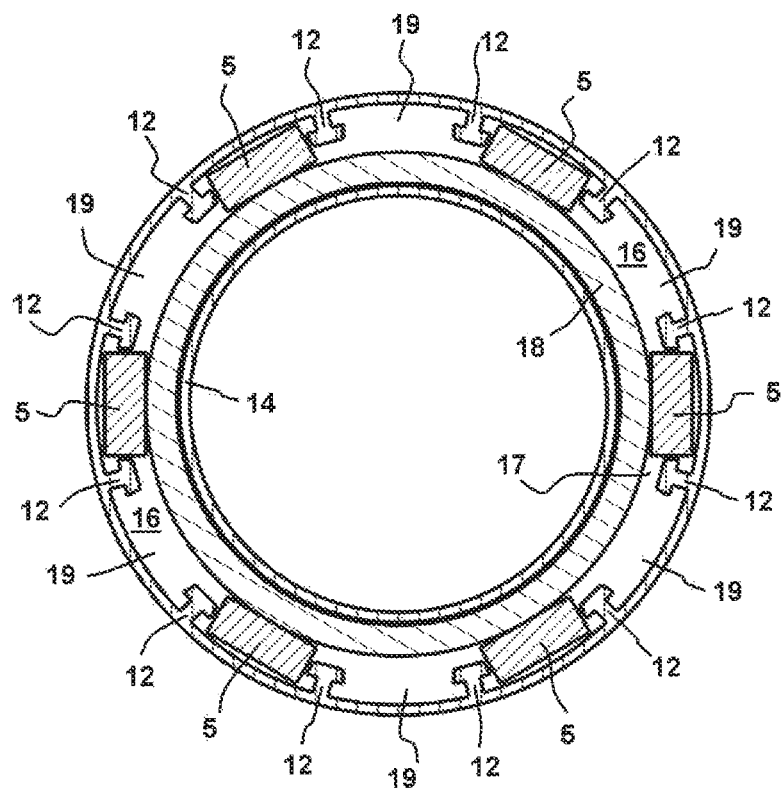
FIG. 2 shows a section through the magnetic coupling rotor of FIG. 1 along line II-II.

The inside diameter of the cage structure forming the holding means 22 is such that when a magnetic coupling is assembled the driven magnetic coupling rotor 2 of FIGS. 1 through 3 can be coaxially positioned in the circular-cylindrical internal space formed by the magnetic coupling, with a coupling enclosure which surrounds it (not shown in the Figures) and which is fluid-tightly connected to the pump casing and which ensures that no fluid issues from the pump casing in the region of the driven magnetic coupling rotor 2.

That arrangement has the advantage that the shaft of the structural unit formed from the driven magnetic coupling rotor 2 and the impeller 1 can be mounted to the pump casing without the opening provided for that shaft to pass through same in the pump casing having to be sealed off. In operation therefore the interior of the casing, formed by the holding means 4, of the driven magnetic coupling rotor 2 can be filled with the fluid to be delivered by the pump.

In the above-described examples it was assumed that the external rotor shown in FIGS. 4 through 6 is the driving magnetic coupling rotor which in turn is driven by a motor while the internal rotor shown in FIGS. 1 through 3 is the driven magnetic coupling rotor which in turn drives the impeller 1.

It should be noted however that the magnetic coupling rotors according to the invention can also be used with an opposite functional attribution, in accordance with which the internal rotor is the driving magnetic coupling rotor and the external rotor is the driven magnetic coupling rotor.

In addition a magnetic coupling constructed from the magnetic coupling rotors according to the invention can be used not only for a fluid pump but also in relation to any other situations of use in which the use of such a magnetic coupling is desirable.

The invention claimed is:

1. An external magnetic coupling rotor having an axis of rotation and comprising:
   holding means including an injection-moldable material which is weakly magnetizable and is in the form of a body which is rotary-symmetrical with respect to said axis of rotation and has an annular flange at one of its axial ends and which, on its peripheral outer side, has recesses with radially open outer sides, said recesses being arranged distributed at equal angular spacings around said axis of rotation; and
   a backiron body of ferromagnetic material being in the form of a cylindrical ring with smooth inside and outside peripheral surfaces,
   wherein the diameters of the holding means and the backiron body are so matched to each other that they can be assembled in mutually coaxial and precisely fitting relationship by pushing said backiron body onto said holding means from an axial end of said holding means opposite to said annular flange until said backiron body comes to bear against said annular flange and at least partially covers said radially open outer sides of said recesses so that an even number of insertion compartments is formed into which an even number of permanent magnets can be inserted in axial direction to be fixedly hold such that they face radially inwardly with one of their pole faces and radially outwardly with the other one, the poles of mutually directly adjacent permanent magnets being in opposite relationship to each other,
   wherein said holding means further has an axial length which is larger than that of said backiron body such that the axial end of the holding means being opposite to said circular flange protrudes in axial direction from said backiron body in the assembled condition, and
   wherein said magnetic coupling rotor further comprises a circular ring which includes a weakly magnetizable material whose inside diameter is so adapted to the outside diameter of the holding means that it can be pushed in the axial direction on to same in precisely fitting relationship, and means for latching said circular ring in a position in which it covers said insertion compartments on the axial end opposite to the annular flange and fixes the permanent magnets disposed therein.

2. The external magnetic coupling rotor as set forth in claim 1 wherein the holding means is in the form of a cage structure having a circular bottom which extends perpendicularly to the axis of rotation and which is connected to said annular flange arranged at an axial spacing from the bottom by connecting ribs which extend parallel to the axis of rotation and which are arranged at spacings from each other in the peripheral direction and which form between them the radially outwardly open recesses.

3. The external magnetic coupling rotor as set forth in claim 2 wherein at the radially inward sides of the connecting ribs projections are provided which project in the peripheral direction and which inwardly fix inserted permanent magnets.

4. The external magnetic coupling rotor as set forth in claim 1 wherein the circular ring has two groups of projections which project in axial direction and which alternate in peripheral direction a first one of said group serving to cover over the insertion compartments and the other one serving for latching said circular ring to said holding means.

5. The external magnetic coupling rotor as set forth in claim 4 wherein the spacings and respective widths of the projections of said first group are respectively equal in the peripheral direction and are of such a size that each of the projections in a pushed-on condition projects into the intermediate space between two adjacent connecting ribs of the holding means to such an extent that a radially inwardly projecting plate provided at its end remote from the circular ring fixes in the axial direction a permanent magnet which is inserted between said two adjacent connecting ribs.

6. The external magnetic coupling rotor as set forth in claim 5 wherein the spacings and respective widths of the projections of said second group are respectively equal in the peripheral direction and are of such a size that in the pushed-on condition each of them comes to lie radially outside a connecting rib of the holding means and latches with a radially inwardly projecting latching nose provided at its axial end remote from the circular ring into a groove which extends parallel to the circular annular flange of the holding means at the radial outward side of the respective connecting rib to fix said circular ring.

7. The external magnetic coupling rotor as set forth in claim 4 wherein the spacings and respective widths of the projections of said second group are respectively equal in the peripheral direction and are of such a size that in a pushed-on condition each of the projections comes to lie radially outside a connecting rib of the holding means and latches with a radially inwardly projecting latching nose provided at its axial end remote from the circular ring into a groove which extends parallel to the circular annular flange of the holding means at the radial outward side of the respective connecting rib to fix said circular ring.

8. A magnetic coupling as set forth in claim 7 wherein fitted into the insertion compartments is an even number of permanent magnets, which number in dependence on the required torque is equal to or less than the number Y of the insertion compartments provided.

9. A magnetic coupling characterized in that its driving rotor is designed as set forth in claim 1.

10. A magnetic coupling characterized in that its driven rotor is designed as set forth in claim 1.

* * * * *